United States Patent
Li et al.

(10) Patent No.: US 8,939,126 B2
(45) Date of Patent: Jan. 27, 2015

(54) VEHICLE WITH VARIABLE AIR INTAKE SYSTEM

(75) Inventors: Lei Li, Whitby (CA); Jonathon K. Ho, Oshawa (CA); Colin M. Hebert, Brighton, MI (US); Gary L. Martinson, DeWitt, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 722 days.

(21) Appl. No.: 13/189,446

(22) Filed: Jul. 22, 2011

(65) Prior Publication Data

US 2013/0019833 A1    Jan. 24, 2013

(51) Int. Cl.
| | |
|---|---|
| *F02M 35/10* | (2006.01) |
| *F02M 35/108* | (2006.01) |
| *F02D 41/18* | (2006.01) |
| *F02M 35/02* | (2006.01) |
| *F02D 41/00* | (2006.01) |
| *F02M 35/16* | (2006.01) |

(52) U.S. Cl.
CPC ... *F02M 35/10013* (2013.01); *F02M 35/10255* (2013.01); *F02M 35/1038* (2013.01); *F02M 35/10386* (2013.01); *F02M 35/108* (2013.01); *F02D 41/18* (2013.01); *F02M 35/0207* (2013.01); *F02D 41/0002* (2013.01); *F02M 35/161* (2013.01); *F02D 2200/0418* (2013.01); *F02D 2200/501* (2013.01); *Y02T 10/42* (2013.01); *F02D 2200/101* (2013.01)
USPC ...................................... 123/361; 123/184.56

(58) Field of Classification Search
CPC ...... F02D 11/00; F02D 11/105; F02D 11/107
USPC ............ 123/361, 184.54, 337, 198 E, 184.55, 123/184.56; 55/68.3, 321–323, 343
See application file for complete search history.

(56) References Cited

U.S. PATENT DOCUMENTS

| | | | |
|---|---|---|---|
| 4,236,597 A | 12/1980 | Kiss et al. | |
| 4,326,865 A | 4/1982 | Siebels | |
| 4,702,756 A * | 10/1987 | Yajima | ............................ 55/482 |
| 5,260,524 A | 11/1993 | Schroeder et al. | |
| 5,679,931 A | 10/1997 | Furse et al. | |
| 5,681,075 A | 10/1997 | Komori et al. | |

(Continued)

OTHER PUBLICATIONS

Two manual pages (page numbers unknown) from 2009 Toyota Camry manual obtained from Internet (URL unknown).

*Primary Examiner* — Hieu T Vo
(74) *Attorney, Agent, or Firm* — Ingrassia Fisher & Lorenz, P.C.

(57) ABSTRACT

In accordance with exemplary embodiments, a variable air intake system and method is provided for a vehicle. The system comprises an engine a controller coupled to the engine. The controller also couples to and controls an air intake system including a first air inlet port and a second air inlet port having a valve operable to move between a closed position and an open position responsive to the controller to provide air to the engine via a filter. A sensor is disposed between the filter and the engine to communicate with the controller for controlling the valve. The method comprises determining engine speed and air flow for an engine of a vehicle and comparing via the engine speed and air flow to a respective high threshold and low threshold. A valve within a second (controlled) air inlet port is opened when the engine speed and air flow each exceed the respective high threshold and closed when the engine speed and air flow each are below the respective low threshold.

18 Claims, 5 Drawing Sheets

(56) References Cited

U.S. PATENT DOCUMENTS

| | | |
|---|---|---|
| 5,696,361 A | 12/1997 | Chen |
| 5,979,598 A | 11/1999 | Wolf et al. |
| 6,105,716 A | 8/2000 | Morehead et al. |
| 6,510,832 B2 | 1/2003 | Maurer et al. |
| 6,668,982 B2 | 12/2003 | LaGarde et al. |
| 7,077,093 B2 | 7/2006 | Koelmel et al. |
| 7,131,262 B2 * | 11/2006 | Sealy et al. ................ 73/114.72 |
| 2004/0011011 A1 | 1/2004 | Storz et al. |
| 2006/0032700 A1 | 2/2006 | Vizanko |
| 2007/0023230 A1 | 2/2007 | Nakayama et al. |
| 2008/0066999 A1 | 3/2008 | Kostun et al. |

* cited by examiner

VEHICLE WITH VARIABLE AIR INTAKE SYSTEM

TECHNICAL FIELD

The technical field generally relates to systems and methodologies for an air intake system for vehicles, and more particularly, to a variable air intake system for internal combustion engines.

BACKGROUND

Internal combustion engines rely upon an ample source of clean air for proper combustion of a supplied fuel. Typically, an air intake system is provided for the engine and is connected with the intake manifold of the engine. Generally, an air intake system includes an air induction opening for drawing-in air and has a filter positioned such that the drawn-in air must pass through the filter to be cleaned prior to entering the intake manifold of the engine.

A consequence of fuel-air combustion within an internal combustion engine is the generation of noise (i.e., unwanted sound). A component of this noise is air intake noise that travels through the engine intake manifold and radiates from the air induction opening. Air intake noise varies in amplitude across a wide frequency spectrum depending upon the operational characteristics of the particular internal combustion engine. To the extent that the air intake noise is audible to passengers within the vehicle, it is undesirable.

Air intake noise can be reduced by employing a small diameter air inlet port within the air intake system. While this arrangement works well at low engine speed (i.e., low revolutions per minute (RPM)), the engine will not be supplied with sufficient air at high engine speed (i.e., high RPM). Conversely, a large diameter air inlet will provide sufficient air at both high and low engine speed, however, such an arrangement leads to increased air intake noise as well as being susceptible to water and snow intrusion due to the large air inlet opening. Conventionally, a snorkel and resonator arrangement (e.g., a Helmholtz resonator) is employed to reduce air intake noise, however, snorkel noise remains a challenge since conventional air intake systems strike a compromise to support both high and low engine speed, and cannot adapt to changing air requirements of an internal combustion engine.

Accordingly, it is desirable to provide an air intake system for an internal combustion engine that can adapt to engine air requirements. Also, it is desirable to provide a variable air intake system that offers protection against water and snow intrusion for the protection of the engine. Additionally, other desirable features and characteristics of the present invention will become apparent from the subsequent description taken in conjunction with the accompanying drawings and the foregoing technical field and background.

BRIEF SUMMARY

In accordance with exemplary embodiments, a variable air intake system is provided for a vehicle. The system comprises an engine a controller coupled to the engine. The controller also couples to and controls an air intake system including a first air inlet port and a second air inlet port having a valve operable to move between a closed position and an open position responsive to the controller to provide air to the engine via a filter. A sensor is disposed between the filter and the engine to communicate with the controller for controlling the valve.

In accordance with exemplary embodiments, a method of operating a variable air intake system is provided for a vehicle. The method comprises determining engine speed and air flow for an engine of a vehicle and comparing via the engine speed and air flow to a respective high threshold and low threshold. A valve within a second (controlled) air inlet port is opened when the engine speed and air flow each exceed the respective high threshold and closed when the engine speed and air flow each are below the respective low threshold.

In accordance with exemplary embodiments, a variable air intake system is provided for a vehicle. The system comprises a controller coupled to and controlling an air intake system including a first air inlet port and a second air inlet port having a valve operable to move between a closed position and an open position responsive to the controller to provide air to the engine via a filter. The valve opens the second air inlet port and blocks the first air inlet port to inhibit snow or rain intrusion into the air intake system.

In accordance with exemplary embodiments, diagnostics for a variable air intake system is provided for a vehicle. The system comprises a controller coupled to and controlling an air intake system including a first air inlet port and a second air inlet port having a valve operable to move between a closed position and an open position responsive to the controller to provide air to the engine via a filter. The controller monitors power levels and operational time of the valve to diagnose valve failure or impediments to proper valve operation.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-8 are merely illustrative and may not be drawn to scale.

Figure 1:
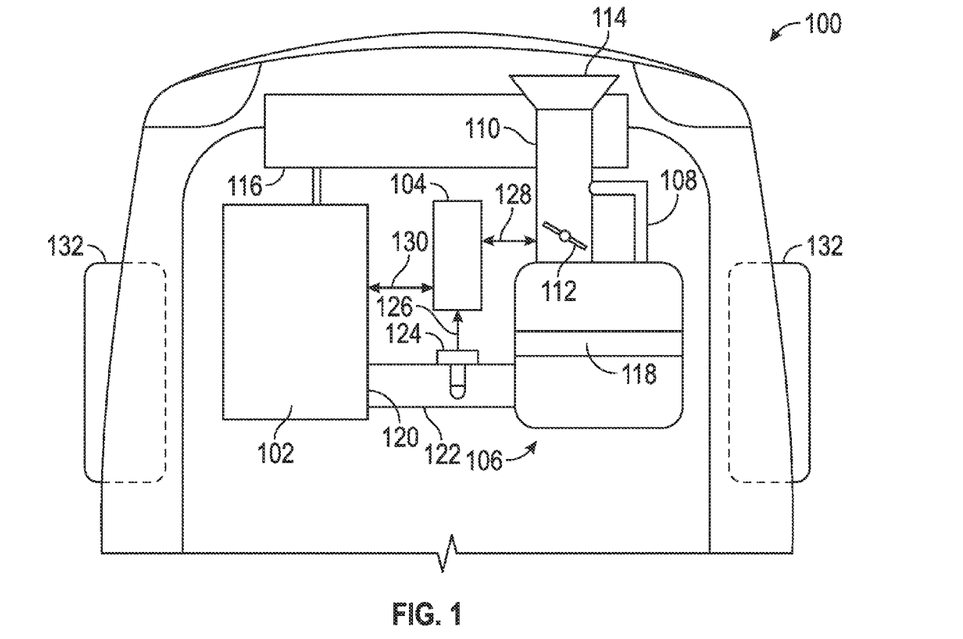
FIG. 1 is an illustration of a vehicle having a variable air intake system in accordance with exemplary embodiments of the present disclosure.

FIG. 1 is a simplified schematic representation of an embodiment of a vehicle 100 according to the present disclosure. Although vehicle 100 is illustrated as having only an internal combustion engine, the techniques and concepts described herein are also applicable to the internal combustion engine of a hybrid electric vehicle (HEV). While FIG. 1 depicts various electrical and mechanical connections and couplings in a very simplified manner for ease of description, an actual embodiment of the vehicle 100 will of course utilize additional physical components and devices that are well known in the automotive industry. For example, numerous conventional accessories would be included in a commercially available vehicle such as window or mirror defoggers, anti-lock brake systems, lighting systems, warning systems (e.g., horn), turn indicators (signals), air conditioning, heated seats, video/audio systems, and power outlet ports for user devices (collectively, accessories). Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

In FIG. 1, the illustrated embodiment of the vehicle 100 includes, without limitation: an engine (e.g., an internal combustion engine) 102; a vehicle control module 104; and an air intake system 106. According to various embodiments, the air intake system 106 includes a first (primary) air inlet port 108 and a second (controlled) air inlet port 110. The second air inlet port 110 includes a valve 112 that operates to move (either directly or in steps) between a closed position and an open position under control of the vehicle control module 104. In exemplary embodiments, the first air inlet 108 generally has a small diameter (that is, smaller than the diameter of the second air inlet port), which provides an advantage of low air intake noise during engine idle and low engine speed (low RPM). However, at higher engine speeds, the valve 112 opens to allow more air to be available for the engine 102 for proper engine performance and better fuel economy. Generally, at high engine RPM (i.e., high vehicle speed), noise within the vehicle is dominated by road or wind noise. Accordingly, the overall larger air intake caused by the valve 112 being open will not substantially contribute to overall noise level within the vehicle.

In the embodiment of FIG. 1, the first air inlet 108 and the second air inlet 110 have a common air intake duct 114 positioned ahead (forward of) a radiator 116. Although not illustrated in detail, the radiator 116 includes multiple cooling channels therein that contain a cooling fluid (i.e., coolant) such as water and/or ethylene glycol (i.e., "antifreeze") and is in fluid communication with the engine 102. In operation, air is drawn-in through the air intake duct 114 and flows through the first air inlet port 108 and the second air inlet port 110 when open (that is, the valve 112 is not in the closed position). Air passes through an air filter 118 and into the air intake manifold 120 of the engine 102 via a conduit 122. The conduit 122 includes a sensor array 124 that employs multiple sensors including a mass air flow (MAF) sensor and an intake air temperature (IAT) sensor. Optionally, an air pressure sensor and humidity sensor may be employed for other advantages such as detecting water and snow intrusion into the air intake system 106. These sensors communicate (126) with the vehicle control module 104 to provide information for the control of the air intake system 106 as will be fully described below.

The vehicle control module 104 may include any type of processing element or vehicle controller, and may be equipped with nonvolatile memory, random access memory (RAM), discrete and analog input/output (I/O), a central processing unit, and/or communications interfaces for networking within a vehicular communications network (not shown). The vehicle control module controls and monitors the operation of the valve 112 via connections 128 as well as controls and receives information (130) from the engine 102, which in turn provides power to the wheels 132 to propel the vehicle 100.

According to various embodiments and features of the present disclosure, the air intake system 106 operates in two modes: A first mode uses only the first (primary) air inlet port 108, while the valve 112 is closed effectively preventing air intake through the second (controlled) air inlet port 110. It will be appreciated that the closed position of the valve 112 does not imply an air-tight seal, but rather, a substantial blocking of air passage through the air inlet port 110. The second mode of operation of the air intake system 106 employs the second air inlet port 110 by opening the valve 112 under control of the vehicle control module 104. In some embodiments the valve 112 moves directly between the closed and open positions, while in other embodiments, the valve 112 moves in steps (e.g., 10% steps, 25% steps) between the open and closed position responsive to the air intake needs of the engine 102. Still other embodiments employ an infinitely variable valve 112 that can be set to any point between the closed and open positions as determined by the vehicle control module 104. Thus, it will be appreciated that an open (that is, non-closed) position is not limited to an unobstructed opening, but rather, a sufficient opening as required to meet the air intake needs of the engine 102 as determined by the vehicle control module 104.

In fundamental embodiments, the vehicle control module 104 uses a two dimensional database (e.g., lookup table) to determine when to open and close the valve 112 based upon engine speed (measured in RPM) and air flow (e.g., mass air flow measured in grams per second). The database may be calibrated for any particular engine type and horsepower and may have the data points set to employ some hysteresis between movement from the open and closed positions or for various steps of opening or closing the valve. Additional features of the various embodiments include the use of an air pressure sensor to detect blockage of the air filter 118, such as by snow intrusion, or a humidity sensor to detect water intrusion such as by rain or melting snow which can reduce engine horsepower and fuel efficiency.

Exemplary embodiments also contemplate the provision of on-board diagnostics (OBD) such as by the vehicle control module 104 monitoring (128) the voltage level of power connections (not shown) for the valve 112. In this way, the vehicle control module 104 provides circuit diagnostics by the ability to detect a cut (open) connection (wire) that is shorted to ground (chassis) or to the power supply (e.g., 5 volts). Additionally, functional diagnostics may be provided by detecting an out-of-range voltage level. That is, a voltage level that is not shorted or indicative of an open connection, but is not within a range (for example 0.5-4.5 volts in a 0-5 volt system) expected for the valve at a given position. Such would indicate a stuck valve or a valve not in the positioned desired by the vehicle control module. Other functional diagnostics including the vehicle control module 104 employing a timer to measure the elapsed time between the valve moving between the closed and open positions or between steps. Excessive valve motion time could also indicate that there is an impediment to the valve operating as intended. In the event of any of these faults being detected, the vehicle control module 104 could cause a diagnostic signal or indication (e.g., "Check Engine", "Service Required") to be presented on a display (not shown) within the vehicle 100 so that the operator could seek repair.

Figure 2:
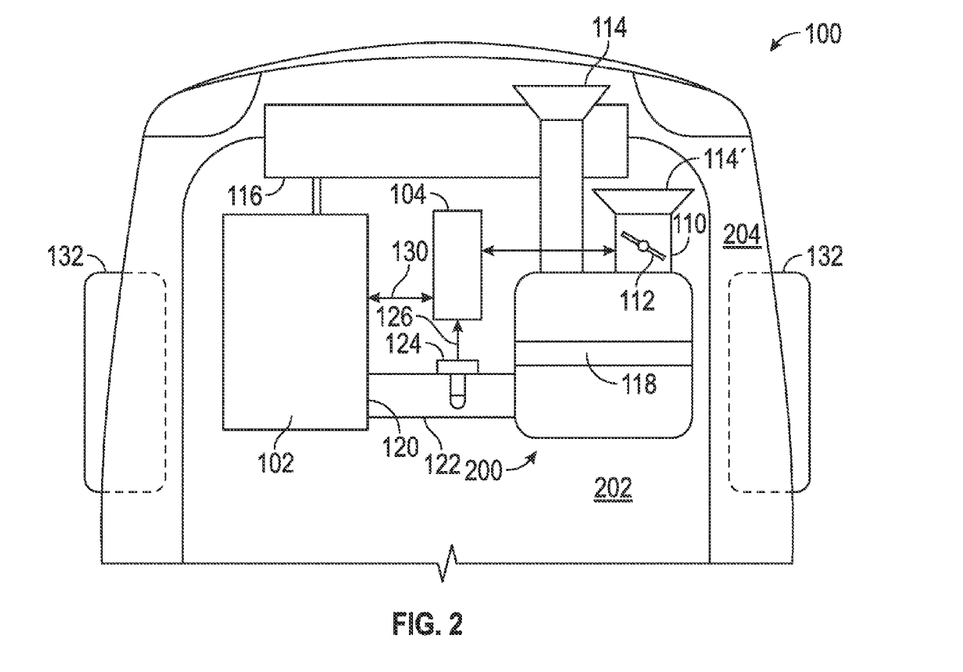
FIG. 2 is an illustration of a vehicle having an alternate variable air intake system in accordance with exemplary embodiments of the present disclosure.

FIG. 2 illustrates a vehicle having an alternate variable air intake system 200 in accordance with exemplary embodiments. For convenience and brevity, only the relevant components will be described in detail. While the embodiment of FIG. 1 offers the best balance in noise reduction and air flow, the embodiment of FIG. 2 is arranged to provide optimized air flow to the engine 102. Air flow is optimized by the provision of independent and separate air intake ducts (114 and 114') for the first (primary) air inlet port 108 and the second (controlled) air inlet port 110, respectively. The first air inlet port 108 has its air intake duct 114 positioned ahead (forward of) the radiator 116, while the second air inlet port 110 has its air intake duct 114' positioned within the engine compartment 202. In this way, the first air inlet port 108 can be implemented with a smaller diameter (relative to the diameter of the second air inlet port 110) to minimize water and snow intrusion through the grill (not shown) of the vehicle 100, while also reducing air intake noise at engine idle and low engine speed (low RPM). By positioning the air intake duct 114' of the second air inlet port 110 inside the engine compartment 202, water and snow intrusion is also reduced and warmer (as compared to ambient air) air can be provided to the engine that could be useful for melting snow lodged in the air filter 118 or for evaporating moisture in the air filter such as by rain intruding through the first air inlet port 108 or moisture remaining after melting snow in the air filter 118. While not illustrated in FIG. 2, it will be appreciated that the air intake duct 114' could alternately be positioned orthogonal to that shown to draw-in air from the fender compartment 204 so long as the air intake duct 114' was protected from water and snow intrusion from the wheel well where the wheel 132 resides.

Figure 3:
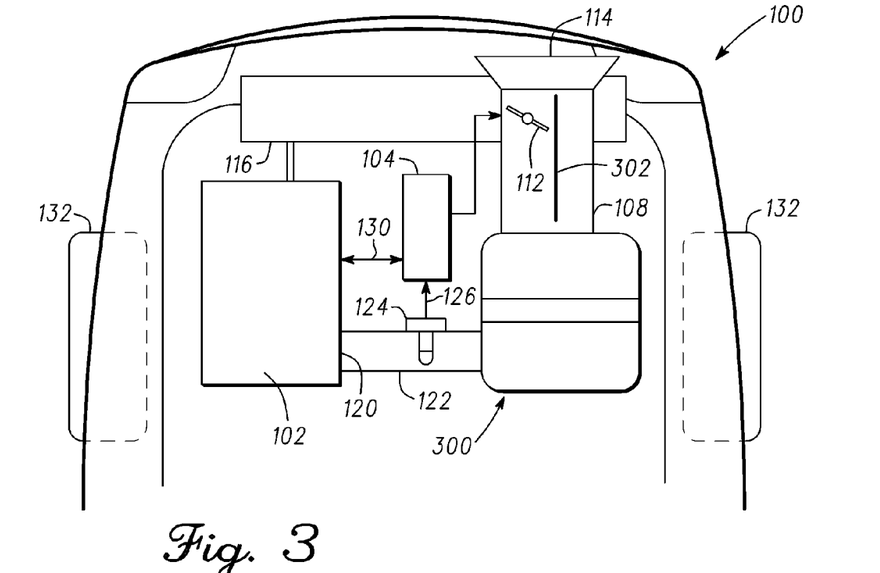
FIG. 3 is an illustration of a vehicle having another alternate variable air intake system in accordance with exemplary embodiments of the present disclosure.

Referring now to FIG. 3, there is shown another alternate embodiment for the air intake system 300 in accordance with exemplary embodiments. For convenience and brevity, only the relevant components will be described in detail. The embodiment of FIG. 3 is optimized for low noise performance and includes a common air intake duct 114 positioned ahead (forward of) the radiator 116. The first (primary) air inlet port and the second (controlled) air inlet port 110 are defined by a dividing partition (wall) 302 arranged as desired for creating the respective diameters of the first and second air inlet ports (108 and 110).

Figure 4:
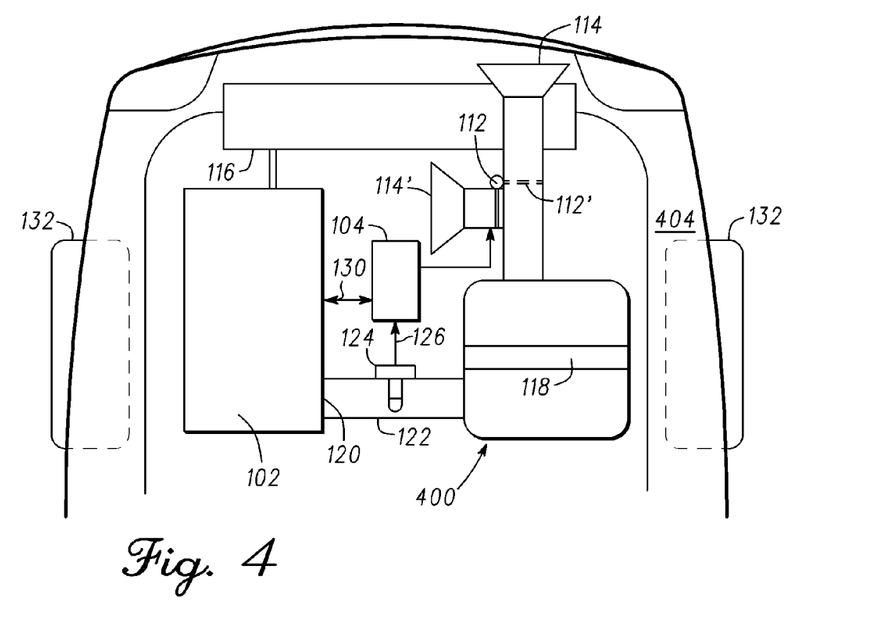
FIG. 4 is an illustration of a vehicle having yet another alternate embodiment of a variable air intake system in accordance with exemplary embodiments of the present disclosure.

In FIG. 4 there is shown yet another alternate embodiment for the air intake system 400 in accordance with exemplary embodiments. For convenience and brevity, only the relevant components will be described in detail. The embodiment of FIG. 4 is provided with an alternate arrangement for protection against water and snow intrusion. According to exemplary embodiments, water intrusion can be detected by the vehicle control module 104 by use of a humidity sensor within the sensor array 124. Also, snow intrusion may be detected by use of a pressure sensor in the sensor array 124 which would signal (126) the vehicle control module 104 of rising pressure within the conduit 122 due to snow blocking the air filter 118.

Similar to the embodiment discussed in connection with FIG. 2, the air intake system 400 includes independent and separate air intake ducts (114 and 114') for the first (primary) air inlet port 108 and the second (controlled) air inlet port 110, respectively. The first air inlet port 108 has its air intake duct 114 positioned ahead (forward of) the radiator 116, while the second air inlet port 110 has its air intake duct 114' positioned within the engine compartment 402. Additionally, the valve 112 is arranged such that the first (primary) air inlet port 108 is closed 112' when opening the second (controlled) air inlet port 110. Closing the first air inlet port 108 prevents further water and snow intrusion while drawing warmer (as compared to ambient air) air into the engine 102 that could be useful for melting snow lodged in the air filter 118 or for evaporating moisture in the air filter such as by rain previously (when air inlet port 108 was open) intruding through the first air inlet port 108 or moisture remaining after melting snow in the air filter 118. Alternately, the valve 112 can be operated in steps (e.g., 10% steps or 25% steps) to partially close the first air inlet port 108 while partially opening the second air inlet port 110 as desired for a controlled response to water and snow intrusion. While not illustrated in FIG. 4, it will be appreciated that the air intake duct 114' could alternately be positioned opposite to that shown to draw-in air from the fender compartment 404 so long as the air intake duct 114' was protected from water and snow intrusion from the wheel well where the wheel 132 resides.

Figure 5:
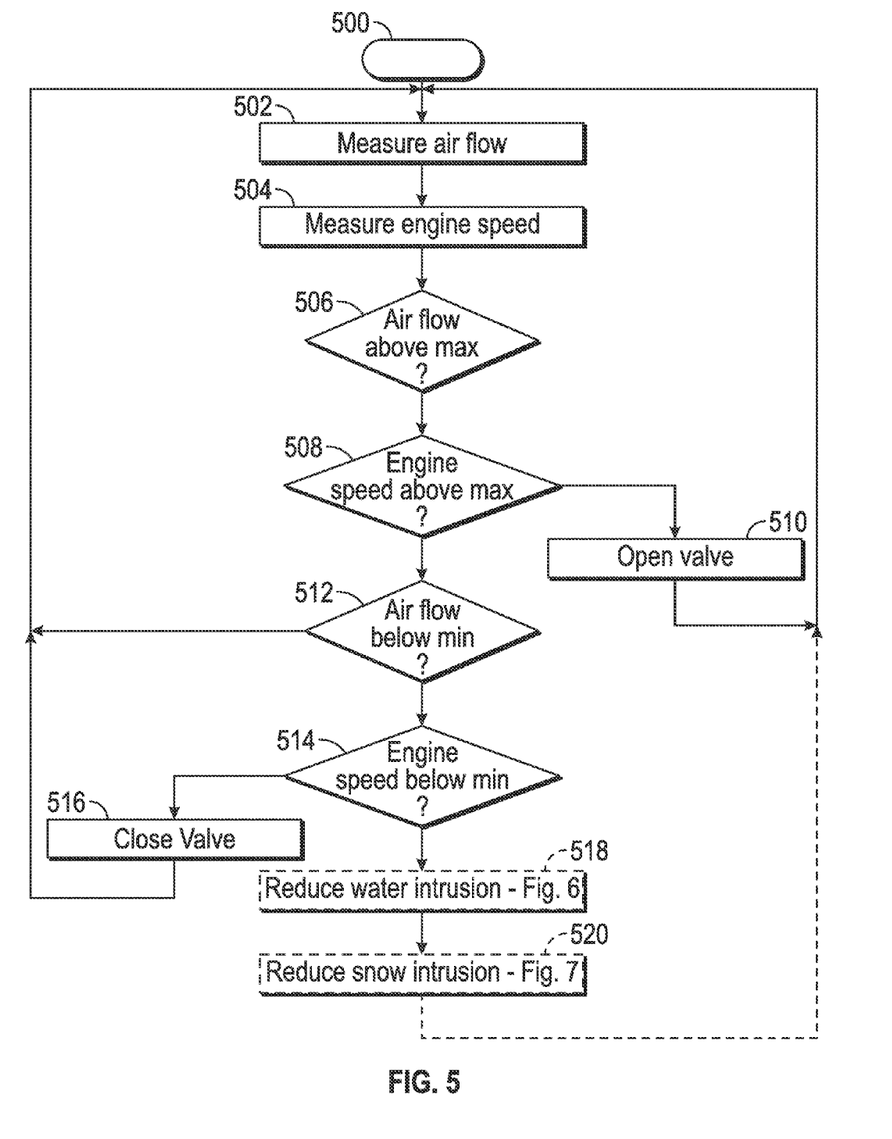
FIG. 5 is a flow diagram illustrating a method for operating the variable air intake system in accordance with exemplary embodiments of the present disclosure.

FIG. 5 is a flow diagram illustrating a method 500 for operating the multiple embodiments of the variable air intake system in accordance with exemplary embodiments. The various tasks performed in connection with the method 500 of FIG. 5 may be performed by software, hardware, firmware, or any combination thereof. For illustrative purposes, the following description of the method of FIG. 5 may refer to elements mentioned above in connection with FIGS. 1-4. In practice, portions of the method of FIG. 5 may be performed by different elements of the described system. It should also be appreciated that the method of FIG. 5 may include any number of additional or alternative tasks and that the method of FIG. 5 may be incorporated into a more comprehensive procedure or process having additional functionality not described in detail herein. Moreover, one or more of the tasks shown in FIG. 5 could be omitted from an embodiment of the method of FIG. 5 as long as the intended overall functionality remains intact.

The method 500 begins in step 502 where air flow is measured (such as by a mass air flow sensor in sensor array 124 of FIG. 1). Next, step 504 measures engine speed (such as by an RPM sensor on engine 102 of FIG. 1). These two parameters are compared a high (maximum) threshold in decisions 506 and 508 respectively. If both measured parameters exceed the high threshold, step 510 opens (completely, in steps or fully variably) the valve (212 in FIG. 1) to allow more air to be provided to the engine (102 in FIG. 1). Should either or both of these parameters fail to meet or exceed the high threshold, the routine proceeds to compare the measured parameters to low (minimum) thresholds in decisions 512 and 514 respectively. If both engine speed and air flow meet or are below the low threshold, step 516 closes (completely, in steps or fully variably) the valve (212 in FIG. 1) to reduce air intake noise. Optionally, step 518 can be employed to reduce water intrusion and/or step 520 can be employed to reduce snow intrusion.

Figure 6:
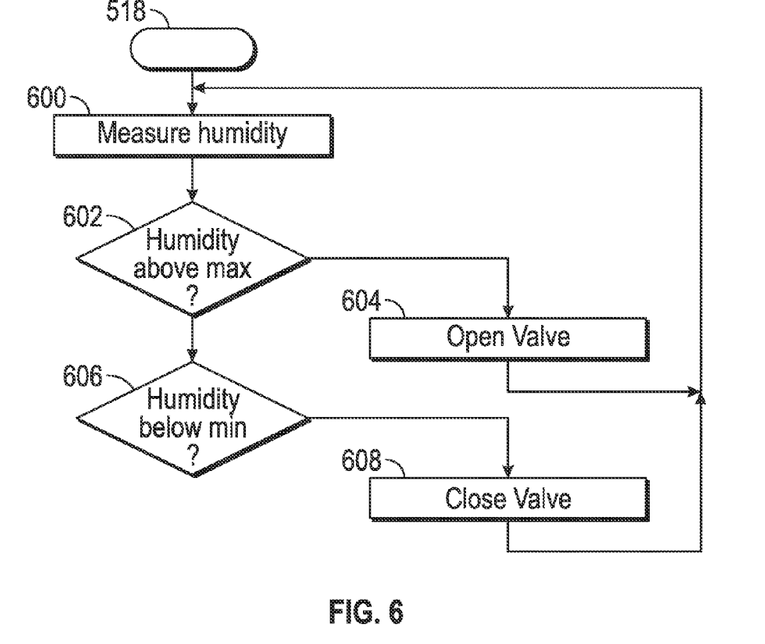
FIG. 6 is a flow diagram illustrating a method for an additional feature of water intrusion protection for the variable air intake system in accordance with exemplary embodiments of the present disclosure.
Figure 7:
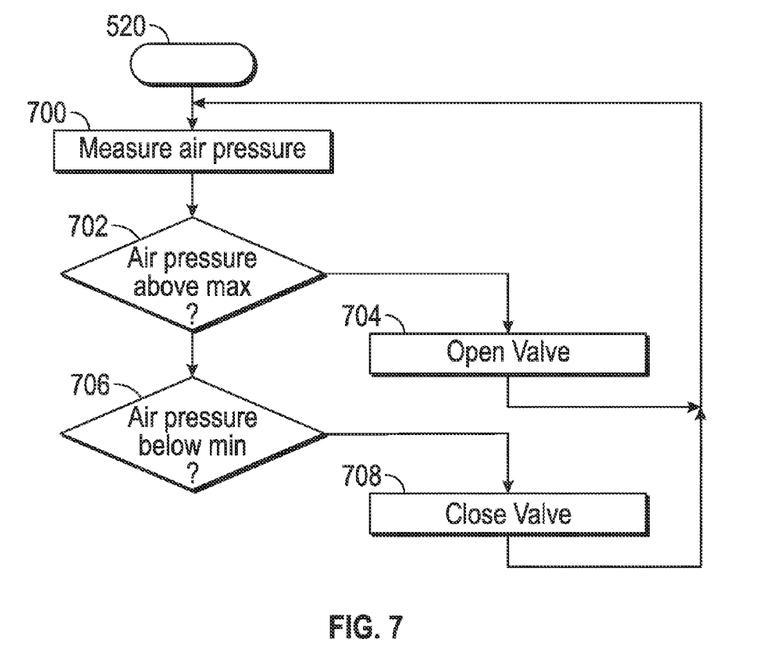
FIG. 7 is a flow diagram illustrating a method for an additional feature of snow intrusion protection for the variable air intake system in accordance with exemplary embodiments of the present disclosure.
Figure 8:
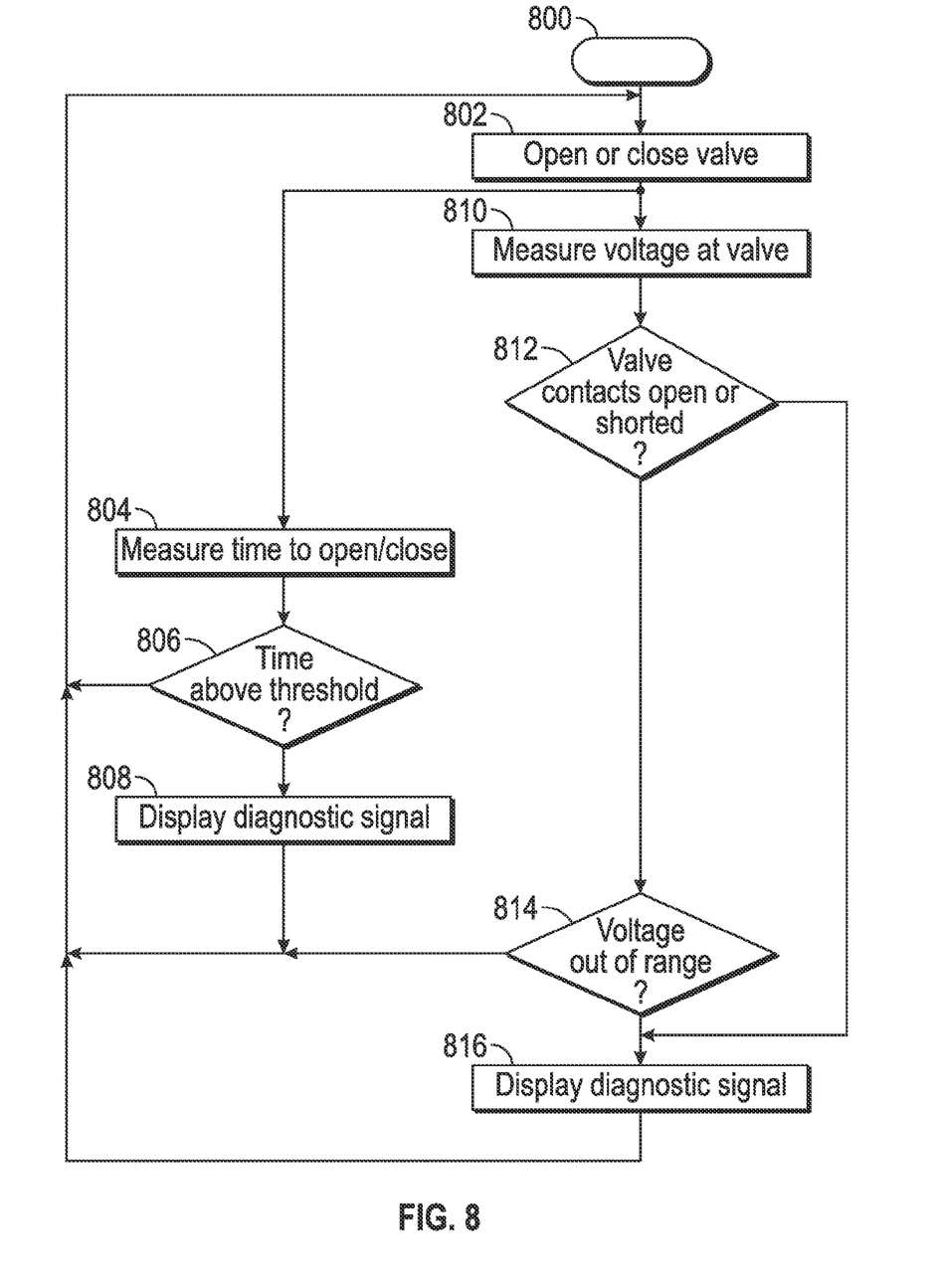
FIG. 8 is a flow diagram illustrating a method for an additional feature of on-board diagnostics (OAB) for the variable air intake system in accordance with exemplary embodiments.

FIGS. 6-8 are methods for additional features that may be advantageously employed with the variable air intake system of the present disclosure. The various tasks performed in connection with the methods of FIGS. 6-8 may be performed by software, hardware, firmware, or any combination thereof. For illustrative purposes, the following description of the methods of FIGS. 6-8 may refer to elements mentioned above in connection with FIGS. 1-4. In practice, portions of the methods of FIGS. 6-8 may be performed by different elements of the described system. It should also be appreciated that the methods of FIGS. 6-8 may include any number of additional or alternative tasks and that the methods of FIGS. 6-8 may be incorporated into a more comprehensive procedure or process having additional functionality not described in detail herein. Moreover, one or more of the tasks shown in FIGS. 6-8 could be omitted from an embodiment of the methods of FIGS. 6-8 as long as the intended overall functionality remains intact.

FIG. 6 is a flow diagram illustrating a method 518 for an additional feature of water intrusion protection for the variable air intake system in accordance with exemplary embodiments. Water intrusion into the air intake system can reduce engine horsepower and fuel efficiency. The water intrusion routine begins in step 600, which measures humidity (such as by a humidity sensor in sensor array 124 of FIG. 1). Decision 602 determines whether the measure humidity level meets or exceeds a high (maximum) threshold. An affirmative determination by decision 602 causes the vehicle control module (104 in FIG. 1) to open (step 604) the valve 212 (completely, in steps or fully variably). In some embodiments (see, FIG. 4), the opening of valve 212 also closes the first (primary) air inlet port (108 in FIG. 1) for further protection against water intrusion. Conversely, a negative determination of decision 602 causes decision 604 to determine whether the measured humidity level is below a low (minimum) threshold. If so, the valve (212 in FIG. 1) is closed (completely, in steps or fully variably) in step 608. Again, in some embodiments (see, FIG. 4), the closing of valve 212 also opens (completely, in steps or fully variably) the first (primary) air inlet port (108 in FIG. 1).

FIG. 7 is a flow diagram illustrating a method 520 for an additional feature of snow intrusion protection for the variable air intake system in accordance with exemplary embodiments. Snow intrusion into the air intake system can clog the air filter, which reduces engine horsepower and fuel efficiency. The snow intrusion routine begins in step 700, which measures air pressure (such as by an air pressure sensor in sensor array 124 of FIG. 1). Decision 702 determines whether the measure air pressure level meets or exceeds a high (maximum) threshold. An affirmative determination by decision 702 causes the vehicle control module (104 in FIG. 1) to open (step 704) the valve 212 (completely, in steps or fully variably). In some embodiments (see, FIG. 4), the opening of valve 212 also closes the first (primary) air inlet port (108 in FIG. 1) for further protection against snow intrusion. Conversely, a negative determination of decision 602 causes decision 604 to determine whether the measured air pressure level is below a low (minimum) threshold. If so, the valve (212 in FIG. 1) is closed (completely, in steps or fully variably) in step 708. Again, in some embodiments (see, FIG. 4), the closing of valve 212 also opens (completely, in steps or fully variably) the first (primary) air inlet port (108 in FIG. 1).

FIG. 8 is a flow diagram illustrating a method 800 for an additional feature of on-board diagnostics (OAB) for the variable air intake system in accordance with exemplary embodiments. The diagnostic routine begins in step 802 where the valve (212 in FIG. 1) is instructed to open or close (completely, in steps or fully variably) by the vehicle control module (104 of FIG. 1). Step 804 employs a timer to measure the elapsed time the valve uses to move per the open/close instruction. Decision 806 determines whether the elapsed time period exceeds a threshold for the instructed operation of valve, which could indicate the presence of an impediment preventing proper valve operation. An affirmative determination from decision 806 causes a diagnostic signal to be presented (step 808) on a display with the vehicle (100 in FIG. 1). Conversely, the routine returns to step 802.

Step 802 also branches the routine to step 810, which measures voltage present on contacts to the valve (212 in FIG. 1). Next, decision 812 determines whether the valve contacts are open (cut wire) or are shorted to ground (chassis) or to the power supply (e.g., 5 volts). A negative determination from decision 812 causes decision 814 to determine if an out-of-range voltage level is present. That is, a voltage level that is not shorted or indicative of an open connection, but is not within a range (for example 0.5-4.5 volts in a 0-5 volt system) expected for the valve at a given position. Such would indicate a stuck valve or a valve not in the positioned desired by the vehicle control module. An affirmative determination from either decision 812 or 814 causes a diagnostic signal to be presented (step 816) on a display with the vehicle (100 in FIG. 1). Conversely, the routine again returns to step 802.

Accordingly, a variable air intake system is provided that offers superior noise and air flow performance compared to conventional air intake systems. Additionally, water and snow intrusion can be reduced using some of the several disclosed embodiments. Finally, reliability of the variable air intake system can be assured through the use of on-board diagnostics ensuring proper operation of the variable air intake system.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A vehicle, comprising:
   an air intake system including a first air inlet port, a second air inlet port, a common air intake duct for the first and second air inlet ports and an air filter providing filtered air;
   an engine receiving the filtered air;

a valve disposed in the second air inlet port and operable to move between a closed position and an open position responsive to a controller coupled to the engine and the valve; and at least one sensor disposed between the filter and the engine and in communication with the controller for controlling movement of the valve between the closed and the open position to provide the filtered air to the engine.

2. The vehicle of claim 1, wherein the at least one sensor further comprises an engine speed sensor and an air flow sensor.

3. The vehicle of claim 1, further comprising a partition in the common air intake duct defining a first diameter for the first air inlet port and a second diameter for the second the second air inlet port.

4. The vehicle of claim 1, further comprising a first air intake duct for the first air inlet port and a second air intake duct for the second air inlet port and wherein the second intake duct is positioned in an engine compartment of the vehicle.

5. The vehicle of claim 1, wherein the first and second air inlet ports are arranged such that valve closes the first air inlet port when opening the second air inlet port.

6. The vehicle of claim 5, further comprising a humidity sensor coupled to the controller wherein the controller opens or closes the valve responsive to measured humidity.

7. The vehicle of claim 5, further comprising an air pressure sensor coupled to the controller wherein the controller opens or closes the valve responsive to measured air pressure within the air intake system.

8. The vehicle of claim 1, wherein moving the valve between the closed and the open position further comprises moving the valve in steps between the closed and the open position.

9. The vehicle of claim 1, further comprising a voltage sensor coupled to the controller for measuring voltage applied to the valve, whereby the controller can detect a broken or shorted connection to the valve and provide a diagnostic signal to a display in the vehicle.

10. The vehicle of claim 1, further comprising a voltage sensor coupled to the controller for measuring voltage applied to the valve, whereby the controller can detect an out of range voltage applied to the valve and provide a diagnostic signal to a display in the vehicle.

11. The vehicle of claim 1, further comprising a timer within the controller for determining a time period for opening or closing the valve, whereby the controller can detect impeded valve operation and provide a diagnostic signal to a display in the vehicle.

12. A method, comprising:
operating an engine for a vehicle via a first air inlet port supplying air to the engine;
determining via a controller an engine speed and air flow for an engine of a vehicle;
comparing via the controller the engine speed and air flow to a respective high threshold;
comparing via the controller the engine speed and air flow to a respective low threshold; and
opening a valve within a second air inlet port via the controller when the engine speed and air flow each exceed the respective high threshold and closing the valve when the engine speed and air flow each are below the respective low threshold.

13. The method of claim 12, further comprising:
determining a humidity level;
comparing the humidity level to a high and low humidity threshold; and
opening the valve within a second air inlet port when the humidity level exceeds the high humidity threshold and closing the valve when the humidity level falls below the low humidity threshold.

14. The method of claim 12, further comprising:
determining an air pressure level;
comparing the air pressure level to a high and low air pressure threshold; and
opening the valve within a second air inlet port when the air pressure level exceeds the high air pressure threshold and closing the valve when the air pressure level falls below the low air pressure threshold.

15. The method of claim 12, wherein opening the valve in the second air inlet port causes the valve to close the first air inlet port.

16. The method of claim 12, further comprising:
measuring a voltage level applied to the valve; and
determining whether the voltage level represents a shorted or out of range voltage level and providing a diagnostic signal via a display in response thereto.

17. The method of claim 16, further comprising:
measuring a time period during operation of the valve; and
providing a diagnostic signal via a display when the time period exceeds a time threshold.

18. A vehicle, comprising:
an air intake system including a first air inlet port having a first diameter, a second air inlet port having a second diameter larger than the first diameter and an air filter providing filtered air;
an engine receiving the filtered air and having an engine speed sensor;
a valve disposed in the second air inlet port and operable to move between a closed position and an open position;
an air flow sensor disposed between the filter and the engine;
a controller coupled to the valve and controlling movement of the valve between the closed position and the open position responsive to the engine speed sensor and the air flow sensor to provide the filtered air to the engine.

* * * * *